UNITED STATES PATENT OFFICE.

SAMUEL C. DAWSON, OF PHILADELPHIA, PENNSYLVANIA.

IMPROVED COMPOSITION FOR TREATING TOBACCO.

Specification forming part of Letters Patent No. 52,976, dated March 6, 1866.

*To all whom it may concern:*

Be it known that I, SAMUEL CARROLL DAWSON, of Philadelphia, Pennsylvania, have invented a Composition Wherewith to Treat Tobacco; and I do hereby declare the following to be a full, clear, and exact description of the same.

My invention consists in the use for treating tobacco of a composition consisting of Indian corn or other cereal and sugar or molasses, or the equivalent to the same, prepared substantially as described hereinafter, the said composition forming a cheap substitute for the imported licorice heretofore used for the same purpose.

In manufacturing tobacco it has been usual heretofore to saturate the dried leaves with water in which licorice has been dissolved, salt being sometimes added to the solution, and, in some instances, anise-seed and other flavoring substances.

Great quantities of licorice are imported from Europe into the United States for the above purpose, and large sums of money are expended by tobacco-manufacturers for this foreign product and for import duties.

After many practical experiments I have discovered that in the treatment of tobacco licorice may be entirely dispensed with by using a composition of which Indian corn or other cereals common to this country form the most prominent ingredient.

I take, for instance, the dry kernels of Indian corn and roast them until they are brown and friable. I then grind them in a suitable mill until they are reduced to fine powder, which I boil in water until a pasty mass is produced. While the composition is boiling sugar, molasses, or other saccharine matter is added, and, if deemed necessary, a quantity of salt and whatever flavoring substances may be selected.

Should the compound be required for transportation, it should be made of about the same consistency as the imported licorice and deposited in cans or boxes, the compound to be diluted with water preparatory to being sprinkled over the leaves of tobacco, precisely as solutions of licorice have been heretofore used. If the preparation has to be manufactured for immediate use, however, it may be made in the first instance thin enough to be applied to the tobacco. If desired, the compound may be used in conjunction with the usual solution of licorice and water.

I have alluded to Indian corn as the principal ingredient of the composition, but roasted rice, wheat, buckwheat, and other cereals may be used with good effect, although I prefer Indian corn. A reasonable proportion of alum may be added to the composition as a preservative.

I claim as my invention and desire to secure by Letters Patent—

The use for treating tobacco of a composition consisting of Indian corn, or other equivalent cereal and sugar or molasses, or other equivalent saccharine matter, prepared substantially as described.

In testimony whereof I have signed my name to this specification in the presence of two subscribing witnesses.

S. C. DAWSON.

Witnesses:
H. HOWSON,
JOHN WHITE.